E. J. TAYLOR.
ROLLER BEARING.
APPLICATION FILED MAY 17, 1907. RENEWED AUG. 7, 1911.

1,020,523.

Patented Mar. 19, 1912.

2 SHEETS—SHEET 1.

WITNESSES

INVENTOR

E. J. TAYLOR.
ROLLER BEARING.
APPLICATION FILED MAY 17, 1907. RENEWED AUG. 7, 1911.

1,020,523.

Patented Mar. 19, 1912.

2 SHEETS—SHEET 2.

WITNESSES
John W. Taylor
George W. Taylor

INVENTOR
Ernest J. Taylor
by his attorney

UNITED STATES PATENT OFFICE.

ERNEST J. TAYLOR, OF HIGHLANDVILLE, MASSACHUSETTS.

ROLLER-BEARING.

1,020,523.  Specification of Letters Patent.  Patented Mar. 19, 1912.

Application filed May 17, 1907, Serial No. 374,305. Renewed August 7, 1911. Serial No. 642,820.

*To all whom it may concern:*

Be it known that I, ERNEST J. TAYLOR, a citizen of the United States, residing at Highlandville, in the county of Norfolk and State of Massachusetts, have invented new and useful Improvements in Roller-Bearings, of which the following is a specification.

This invention relates to roller bearings for shafting, the object of the invention being to provide an anti-friction bearing for shafting, whether the same is used in connection with a parallel line of shafting or whether the same may be used in connection with shafting to which an end thrust is applied.

The object of the invention is further to provide a bearing of the character set forth which eliminates sliding friction by means of rollers so arranged with relation to each other that they roll on the parts with which they contact.

The invention consists, in a roller bearing, of the combination and arrangement of parts set forth in the following specification and particularly pointed out in the claims thereof.

Figure 1:
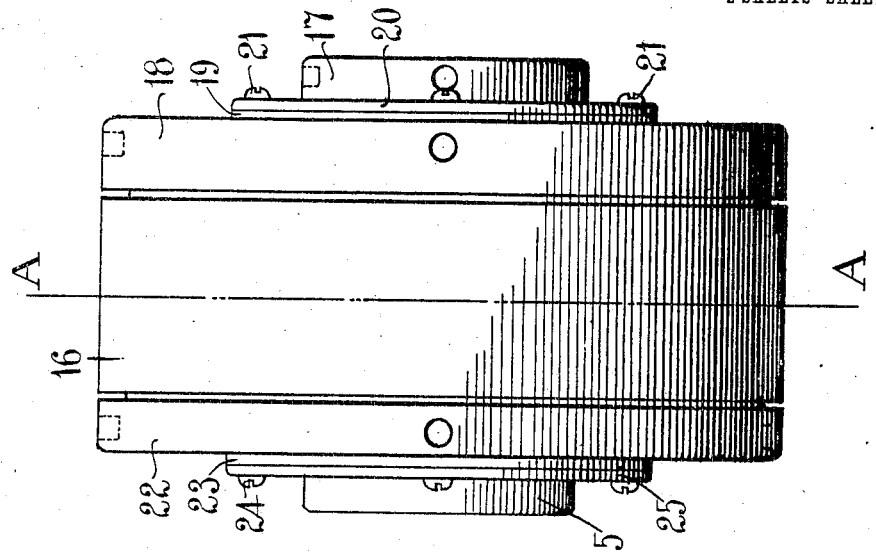
Figure 2:
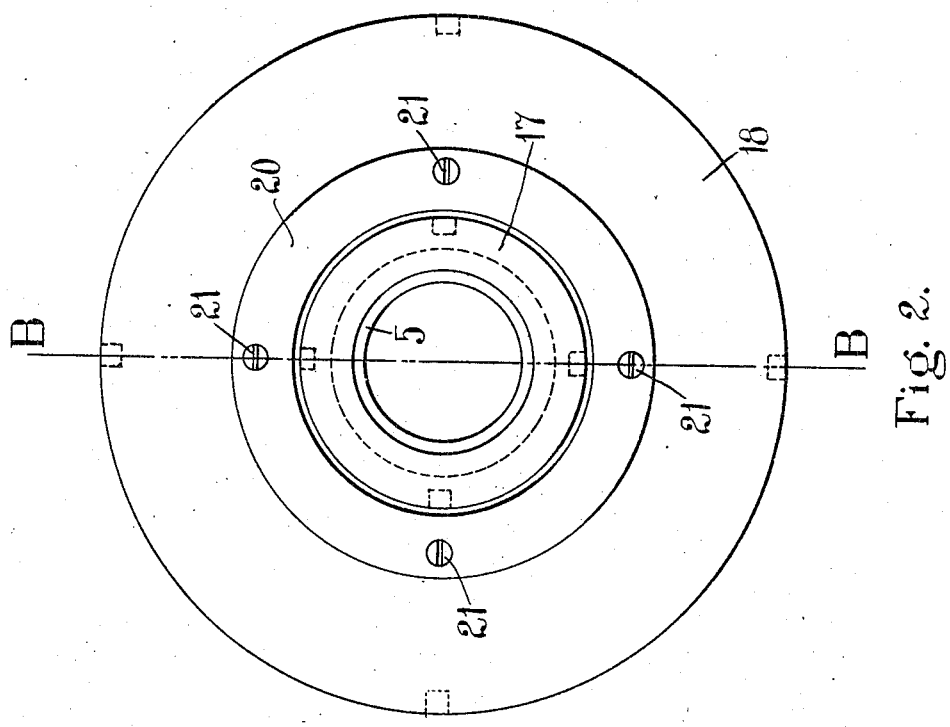
Figure 4:
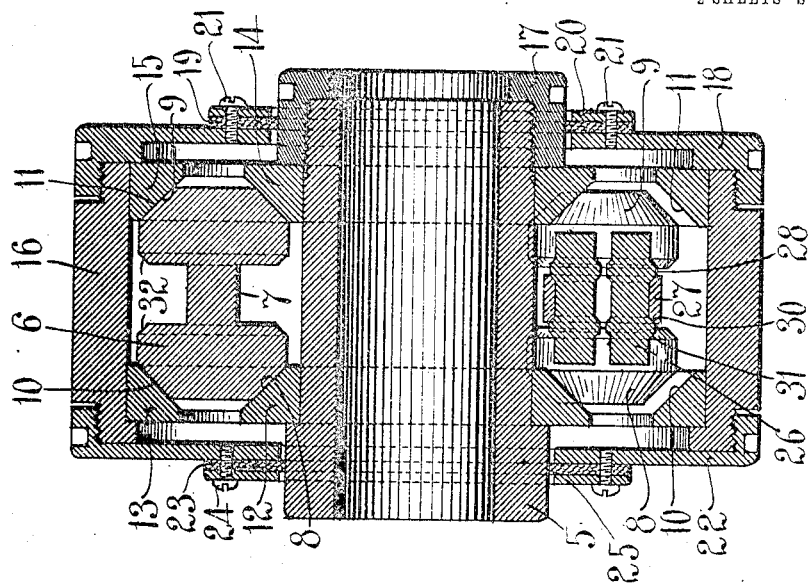
Figure 3:
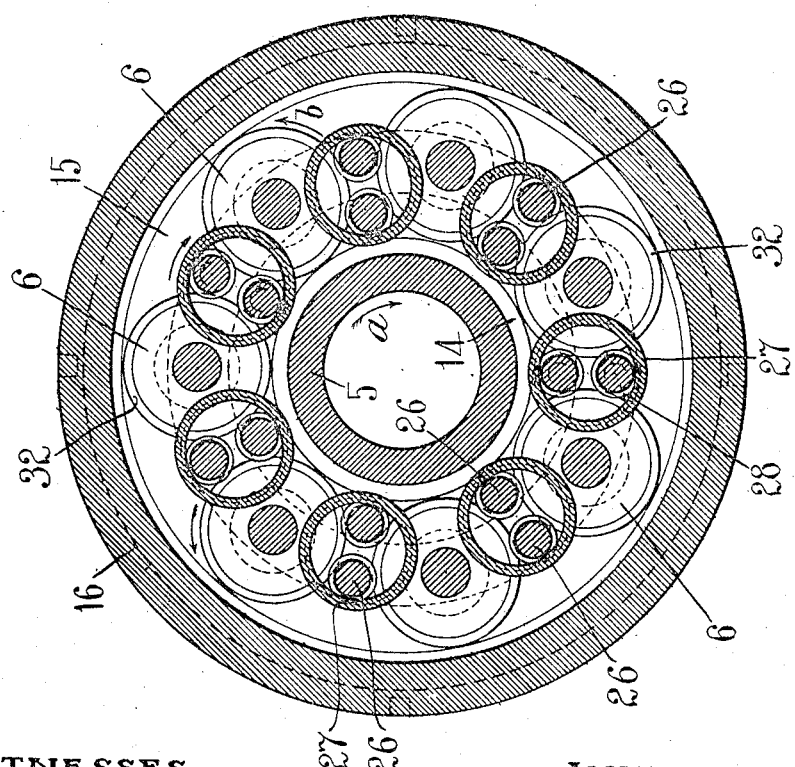

Referring to the drawings: Figure 1 is a side elevation of my improved roller bearing. Fig. 2 is a plan view of the same. Fig. 3 is a sectional elevation taken on line A—A of Fig. 1. Fig. 4 is a sectional elevation taken on line B—B of Fig. 2.

Like numerals refer to like parts throughout the several views of the drawings.

In the drawings, 5 is a sleeve adapted to be fastened to a shaft.

6, 6 are supporting rollers arranged in series, each of said rollers having an annular groove 7 therein, preferably midway between the opposite ends thereof. The opposite ends of the rollers 6 have oppositely inclined conical ends 8, 9 which bear against corresponding conical faces 10, 11 formed upon the bearing rings 12, 13 and 14, 15, respectively. The bearing rings 12 and 14 are mounted upon the sleeve 5 and the bearing rings 13 and 15 are mounted within a hollow cylindrical casing 16. Said bearing rings 13 and 15 are internally beveled and contact with an inner circumferential surface within said casing 16. The bearing ring 12 rests against a shoulder formed upon the periphery of the sleeve 5, while the bearing ring 13 rests against a shoulder formed within the casing 16.

The bearing ring 14 is adjusted longitudinally of the sleeve 5 in order to bring its conical face in contact with one conical end of the supporting rollers 6 by a collar 17 which has screw-threaded engagement with said sleeve and bears against the bearing ring 14, said collar 17 constituting a lock to prevent said bearing ring 14 from moving longitudinally in one direction on said sleeve. The bearing ring 15 is adjusted longitudinally within the casing 16 by a plate 18 which has screw-threaded engagement with the casing 16 and bears against said bearing ring 15, so that by rotating the plate 18 toward the right, the conical face of the bearing ring 15 is brought to bear against one conical end of the supporting rolls 6. It will thus be seen that the plate 18 constitutes a lock to prevent the bearing ring 15 from moving longitudinally in one direction within the casing 16.

A felt washer 19 is clamped to the outer face of the plate 18 by a washer 20 and screws 21. The opposite end of the casing 16 from that to which the plate 18 is attached has a cover plate 22 which has screw-threaded engagement therewith and has attached thereto a felt washer 23 by means of screws 24 and a washer 25. The felt washers 19 and 23 serve to keep the dust from entering the interior of the bearing.

Separating rolls 26, 26 are arranged in pairs, each pair of said rolls being inclosed within a retaining ring 27, which projects into the annular grooves 7, 7 in the supporting rolls 6 adjacent thereto. Each of the separating rolls is provided with two annular ribs 28, 28. These annular ribs are preferably beveled or conical upon their opposite sides, thus forming inner beveled shoulders 30, 30 and outer beveled shoulders 31, 31 upon the peripheries of said separating rolls. The inner beveled shoulders 30 bear against corresponding conical or beveled surfaces formed upon the inner edges of the rings 27, and thus keep said rings out of contact with the supporting rolls 6. The outer beveled shoulders 31, 31 bear against beveled edges 32 upon the supporting rolls 6, said beveled edges being adjacent to the annular grooves 7 in said supporting rolls. It will thus be seen that the double beveled shoulders or ribs 28, 28 prevent the separating rolls from moving longitudinally of the bearing relatively to the separating rolls.

In operation the casing may revolve about the shaft or the shaft may revolve within the casing. Assuming the latter to be the fact and that the shaft with the sleeve 5 attached thereto rotates in the direction of the arrow $a$ (Fig. 3), the supporting rolls will rotate in the direction of the arrow $b$ (Fig. 3) while the separating rolls will rotate in the direction of the arrows thereon. Thus, it will be seen that a rolling friction takes place between the bearing rings 12 and 14 and the supporting rolls 6; also that a rolling friction takes place between the supporting rolls 6 and the bearing rings 13 and 15 and that a rolling friction takes place between the separating rolls and supporting rollers and also between the separating rolls and their retaining rings 27.

Having thus described my invention, what I claim and desire by Letters Patent to secure is:

1. In a roller bearing, a series of supporting rollers, a pair of separating rollers between each pair of adjacent supporting rollers, and a retaining ring extending around each of said pairs of separating rollers and projecting into annular grooves provided in said adjacent supporting rollers.

2. In a roller bearing, a casing, a series of supporting rollers each having oppositely inclined conical peripheries at opposite ends thereof, respectively, bearing rings having conical faces adapted to bear against said conical peripheries, and means to adjust said bearing rings longitudinally of said rollers, a pair of separating rollers between each pair of adjacent supporting rollers, and a retaining ring extending around said pair of separating rollers and projecting into annular grooves provided in said adjacent supporting rollers.

3. In a roller bearing, a series of supporting rollers, a pair of separating rollers between each pair of adjacent supporting rollers, each of said separating rollers having two annular ribs upon its periphery, and a retaining ring extending around each of said pairs of separating rollers between said annular ribs and projecting into annular grooves provided in said adjacent supporting rollers.

4. In a roller bearing, a series of supporting rollers, a pair of separating rollers between each pair of adjacent supporting rollers, each of said separating rollers having two annular ribs upon its periphery, and a retaining ring extending around each of said pairs of separating rollers between said annular ribs and projecting into annular grooves provided in said adjacent supporting rollers, said annular ribs being adapted to bear against the opposite side walls of said annular grooves.

5. In a roller bearing, a sleeve, two bearing rings thereon having oppositely inclined conical faces, respectively, and means to adjust one of said rings longitudinally on said sleeve, an annular casing, two bearing rings therein having oppositely inclined conical faces, respectively, and means to adjust one of said rings longitudinally in said casing, a series of supporting rollers each having oppositely inclined conical peripheries at opposite ends thereof, respectively, adapted to bear against the corresponding conical faces on said bearing rings, a pair of separating rollers between each pair of adjacent supporting rollers, and a retaining ring extending around each of said pairs of separating rollers and projecting into annular grooves provided in said adjacent supporting rollers.

6. A roller bearing, a sleeve, two bearing rings thereon having oppositely inclined conical faces, respectively, a collar having screw-threaded engagement with said sleeve and adapted to bear against one of said bearing rings, whereby the same may be adjusted longitudinally on said sleeve; an annular casing, two bearing rings therein having oppositely inclined beveled faces, respectively, a plate having screw-threaded engagement with said annular casing and adapted to bear against one of the bearing rings therein, whereby said bearing ring may be adjusted longitudinally within said casing, a series of supporting rollers each having oppositely inclined conical peripheries at opposite ends thereof, respectively, adapted to bear against the corresponding conical faces on said bearing rings, a pair of separating rollers between each pair of adjacent supporting rollers, and a retaining ring extending around each of said pairs of separating rolls and projecting into annular grooves provided in said adjacent supporting rollers.

7. In a roller bearing, the combination of a series of supporting rollers, two separating rollers between each pair of adjacent supporting rollers, said separating rollers having two beveled shoulders on their peripheries, a retaining ring extending around each pair of separating rollers between said beveled shoulders, said ring projecting into an annular groove provided in said supporting rollers and out of contact therewith, and means to prevent longitudinal displacement of said separating rollers.

8. In a roller bearing, the combination of a casing, internally beveled rings contacting with an inner circumferential surface of said casing, a series of supporting rollers having conical ends, two separating rollers between each pair of adjacent supporting rollers, said separating rollers having two beveled shoulders on their peripheries, a retaining ring extending around each pair of separating rollers between said beveled shoulders, said retaining rings projecting into annular grooves provided in said adjacent supporting rollers and out of contact with said supporting rollers, and means to prevent the longitudinal displacement of said separating rollers.

9. In a roller bearing, the combination of a hollow casing, internally beveled rings contacting with an inner circumferential surface of said casing, means to lock one of said beveled rings against longitudinal movement within said casing in one direction, a series of supporting rollers having conical ends, two separating rollers having two beveled shoulders upon the periphery thereof, a retaining ring extending around each pair of separating rollers and located between said beveled shoulders, said retaining ring projecting into an annular groove provided in said supporting rollers and out of contact with said supporting rollers, and means to prevent longitudinal displacement of said separating rollers.

10. In a roller bearing, the combination of a hollow sleeve, beveled conical bearing rings mounted upon the periphery of said sleeve, a series of supporting rollers having conical ends adapted to roll upon said conical bearing rings, two separating rollers between each pair of adjacent supporting rollers, said separating rollers having two beveled shoulders upon their peripheries, a retaining ring extending around each pair of separating rollers between said beveled shoulders, said retaining rings projecting into annular grooves provided in said supporting rollers and out of contact with said supporting rollers, and means to prevent the longitudinal displacement of said separating rollers.

11. In a roller bearing, the combination of a hollow sleeve, conical bearing rings mounted upon said sleeve, means to lock one of said bearing rings against longitudinal displacement upon said sleeve in one direction, a series of supporting rollers having conical ends adapted to roll upon said rings, two separating rollers between each pair of adjacent supporting rollers, said separating rollers having two beveled shoulders upon the periphery thereof, a retaining ring for each pair of separating rollers located between said beveled shoulders, said ring projecting into an annular groove provided in said supporting rollers and out of contact with said rollers, and means to prevent the longitudinal displacement of said separating rollers.

12. In a roller bearing, the combination of a hollow casing, a sleeve concentric with said casing, conical bearing rings mounted upon the periphery of said sleeve, a series of supporting rollers having conical ends, two separating rollers between each adjacent pair of supporting rollers, said separating rollers each having two beveled shoulders upon their peripheries, a retaining ring for each pair of separating rollers located between said beveled shoulders, said ring projecting into an annular groove provided in said supporting rollers and out of contact with said rollers, and means to prevent the longitudinal displacement of said supporting rollers.

13. In a roller bearing, the combination of a hollow casing, a sleeve concentric with said casing, conical bearing rings mounted upon the periphery of said sleeve, means to lock one of said bearing rings against longitudinal movement upon said sleeve in one direction, a series of supporting rollers having conical ends adapted to roll upon said bearing rings, two separating rollers between each pair of adjacent supporting rollers, said separating rollers each having two beveled shoulders upon the periphery thereof, a retaining ring for each pair of separating rollers located between said beveled shoulders, said ring projecting into an annular groove provided in said supporting rollers and out of contact with said supporting rollers, and means to prevent the longitudinal displacement of said separating rollers.

14. In a roller bearing, the combination of a hollow casing, beveled rings contacting with an inner circumferential surface of said casing, means for locking one of said beveled rings against longitudinal displacement within said casing in one direction, a series of supporting rollers having conical ends, two separating rollers between each pair of adjacent supporting rollers, each of said separating rollers having two beveled shoulders upon its periphery, a retaining ring for each pair of separating rollers located between said beveled shoulders, said ring projecting into annular grooves provided in said supporting rollers and out of contact with said rollers, and means to prevent the longitudinal displacement of said supporting rollers.

15. In a roller bearing, the combination of a hollow casing, internally beveled rings contacting with an inner circumferential surface of said casing, means to lock one of said rings against movement longitudinally within said casing in one direction, a sleeve concentric with said casing, a series of supporting rollers having conical ends adapted to roll upon said rings, two separating rollers between each pair of adjacent supporting rollers, said separating rollers each having two beveled shoulders upon its periphery, a retaining ring for each pair of separating rollers located between said beveled shoulders, said ring projecting into annular grooves provided in said supporting rollers and out of contact with said supporting rollers, and means to prevent longitudinal displacement of said separating rollers.

16. In a roller bearing, the combination of a hollow casing, internally beveled rings contacting with an inner circumferential surface of said casing, a sleeve concentric with said casing, conical bearing rings supported on said sleeve, means for locking said conical rings against longitudinal movement upon said sleeve in one direction, a series of supporting rollers having conical ends adapted to roll upon said rings, two separating rollers between each adjacent pair of supporting rollers, each of said separating rollers having two beveled shoulders upon its periphery, a retaining ring for each pair of separating rollers located between said beveled shoulders, said ring projecting into annular grooves provided in said supporting rollers and out of contact with said supporting rollers, and means to prevent the longitudinal displacement of said separating rollers.

17. In a roller bearing, the combination of a hollow casing, internally beveled rings contacting with an inner circumferential surface of said casing, means to lock one of said internally beveled rings against longitudinal movement within said casing in one direction, a sleeve concentric with said casing, conical bearing rings mounted upon said sleeve, means to lock said conical bearing rings against longitudinal movement upon said sleeve in one direction, a series of supporting rollers having conical ends adapted to roll upon said rings, two separating rollers between each pair of adjacent supporting rollers, each of said separating rollers having two beveled shoulders upon its periphery, a retaining ring extending around each pair of separating rollers and located between said beveled shoulders, said ring projecting into annular grooves provided in said supporting rollers, and means to prevent the longitudinal displacement of said separating rollers.

18. In a roller bearing, the combination of a series of supporting rollers provided with annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, a retaining ring extending around each pair of separating rollers between said double beveled shoulders, said retaining ring projecting into annular grooves in said supporting rollers and out of contact with said supporting rollers.

19. In a roller bearing the combination of an outer casing, internally beveled rings contacting with an inner circumferential surface of said casing, a series of supporting rollers provided with annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

20. In a roller bearing, the combination of a casing, internally beveled rings contacting with an inner circumferential surface of said casing, means to lock one of said rings against movement longitudinally within said casing in one direction, a series of supporting rollers provided with annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

21. In a roller bearing, the combination of a sleeve, conical bearing rings mounted upon the periphery of said sleeve, a series of supporting rollers provided with annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

22. In a roller bearing, the combination of a sleeve, conical bearing rings mounted upon said sleeve, means to lock one of said bearing rings against movement longitudinally of said sleeve in one direction, a series of supporting rollers provided with annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

23. In a roller bearing, the combination of a casing, a sleeve concentric with said casing, conical bearing rings mounted upon said sleeve, a series of supporting rollers provided with annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

24. In a roller bearing, the combination of a casing, a sleeve concentric with said casing, conical bearing rings mounted upon said sleeve, means to lock one of said bearing rings against movement longitudinally of said sleeve in one direction, a series of supporting rollers provided with annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

25. In a roller bearing, the combination of a casing, internally beveled rings contacting with an inner circumferential surface of said casing, means to lock one of said internally beveled rings against movement longitudinally within said casing in one direction, a series of supporting rollers having conical ends adapted to roll upon said rings and provided with annular grooves in their peripheries midway between their ends and having beveled edges adjacent to said grooves, two separating rollers located between each pair of adjacent supporting rollers, each of said separating rollers having two double beveled shoulders upon its periphery the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

26. In a roller bearing, the combination of a casing, internally beveled rings contacting with an inner circumferential surface of said casing, means to lock one of said internally beveled rings against longitudinal movement in one direction relatively to said casing, a sleeve concentric with said casing, a series of supporting rollers provided with annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

27. In a roller bearing, the combination of a casing, internally beveled rings contacting with an inner circumferential surface of said casing, a sleeve concentric with said casing, conical bearing rings mounted upon said sleeve, means to lock said conical bearing rings against movement longitudinally upon said sleeve in one direction, a series of supporting rollers having conical ends adapted to roll upon said rings and provided with annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

28. In a roller bearing, the combination of a casing, internally beveled rings contacting with an inner circumferential surface of said casing, means to lock said rings against movement longitudinally of said casing in one direction, a sleeve concentric with said casing, conical bearing rings mounted upon the periphery of said sleeve, means to lock said conical bearing rings against movement longitudinally of said sleeve in one direction, a series of supporting rollers having conical ends adapted to roll upon said rings and having annular grooves in their peripheries midway between their ends and having beveled edges adjacent to said grooves, two separating rollers located between each pair of adjacent supporting rollers, each of said separating rollers having two double beveled shoulders upon its periphery, the outer bevels of said double beveled shoulders engaging the beveled edges of said supporting rollers, whereby said separating rollers are prevented from longitudinal displacement, and a retaining ring extending around each pair of separating rollers between said double beveled shoulders, said retaining ring projecting into annular grooves in said supporting rollers and out of contact with said supporting rollers.

In testimony whereof I have hereunto set my hand in presence of two subscribing witnesses.

ERNEST J. TAYLOR.

Witnesses:
 LOUIS A. JONES,
 GEORGE W. TAYLOR